J. J. McCARTHY.
LOCOMOTIVE HEADLIGHT.
APPLICATION FILED MAY 21, 1915.

1,170,300.

Patented Feb. 1, 1916.
2 SHEETS—SHEET 1.

Witnesses

Inventor
J. J. McCarthy.

Attorney

J. J. McCARTHY.
LOCOMOTIVE HEADLIGHT.
APPLICATION FILED MAY 21, 1915.
1,170,300.
Patented Feb. 1, 1916.
2 SHEETS—SHEET 2.
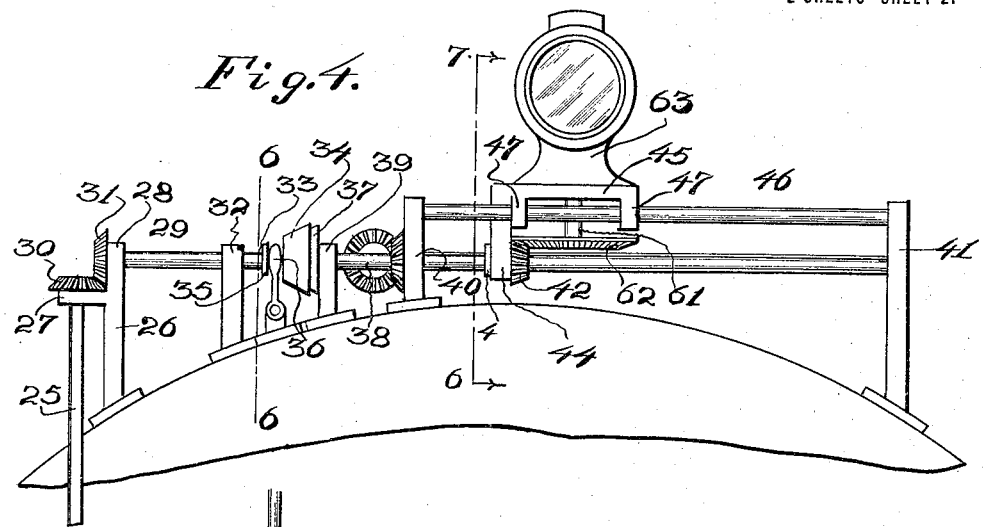
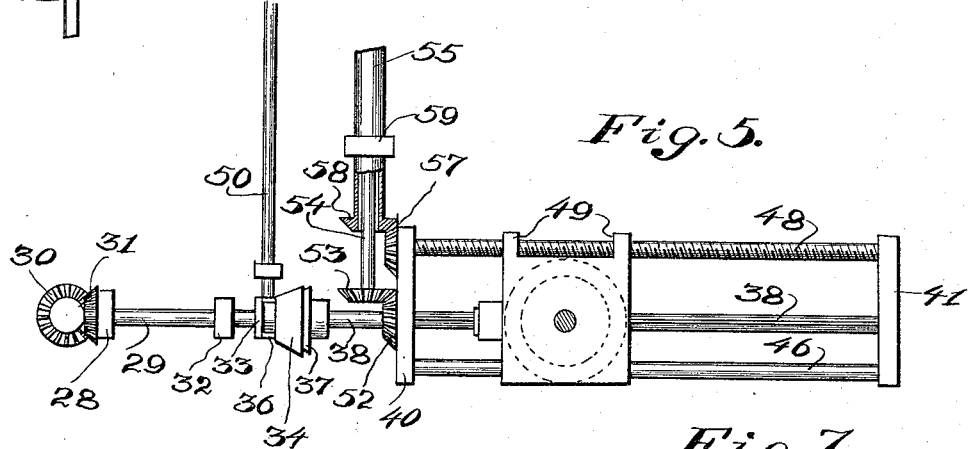
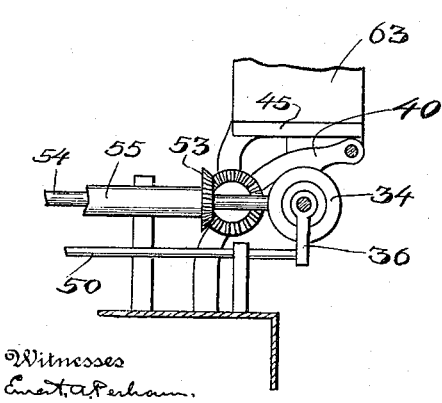
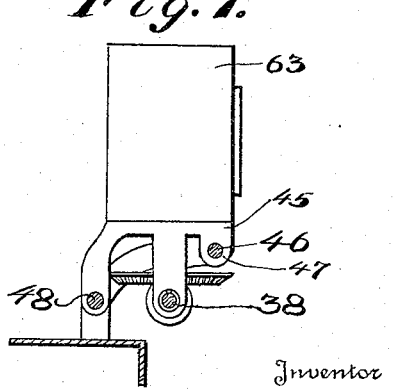
Inventor
J. J. McCarthy.

UNITED STATES PATENT OFFICE.

JAMES J. McCARTHY, OF NASHVILLE, TENNESSEE.

LOCOMOTIVE-HEADLIGHT.

1,170,300.

Specification of Letters Patent.

Patented Feb. 1, 1916.

Application filed May 21, 1915. Serial No. 29,565.

*To all whom it may concern:*

Be it known that I, JAMES J. MCCARTHY, a citizen of the United States, residing at Nashville, in the county of Davidson and State of Tennessee, have invented certain new and useful Improvements in Locomotive-Headlights; and I do hereby declare the following to be a full, clear, and exact description of the invention, such as will enable others skilled in the art to which it appertains to make and use the same.

This invention relates to new and useful improvements in locomotive headlights and the principal object of the invention is to provide a locomotive with a dirigible headlight so that the light rays will be directed according to the turn of the pony truck of the locomotive.

Another object of the invention is to provide a headlight capable of being actuated from the cab of the locomotive so that the light may be thrown in various directions at the will of the user.

A further object of the invention is to provide a locomotive headlight capable of being shifted to the side so that the light rays may be directed rearwardly of the train in order to throw the light rays back over the train if desired.

A further object of the invention is to provide a device which is equally capable of being adapted to street cars, motor vehicles and the like with slight modifications of the structure.

With these and other objects in view, the invention consists in the novel combination and arrangement of parts which will be fully set forth in the following specification and accompanying drawings, in which:—

Figure 1:
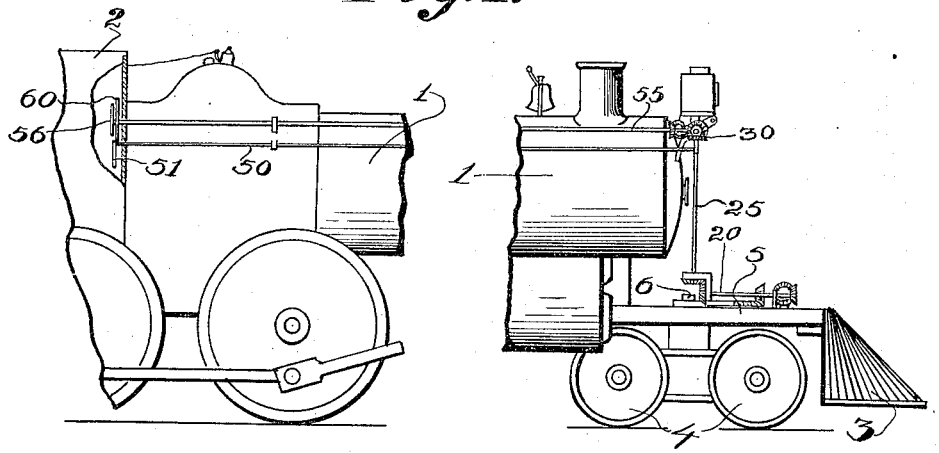
Figure 2:
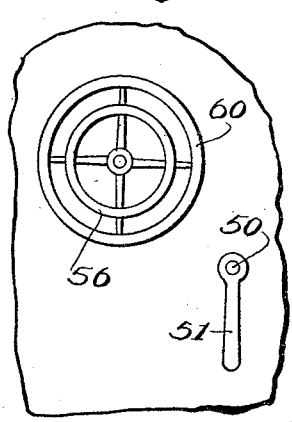
Figure 3:
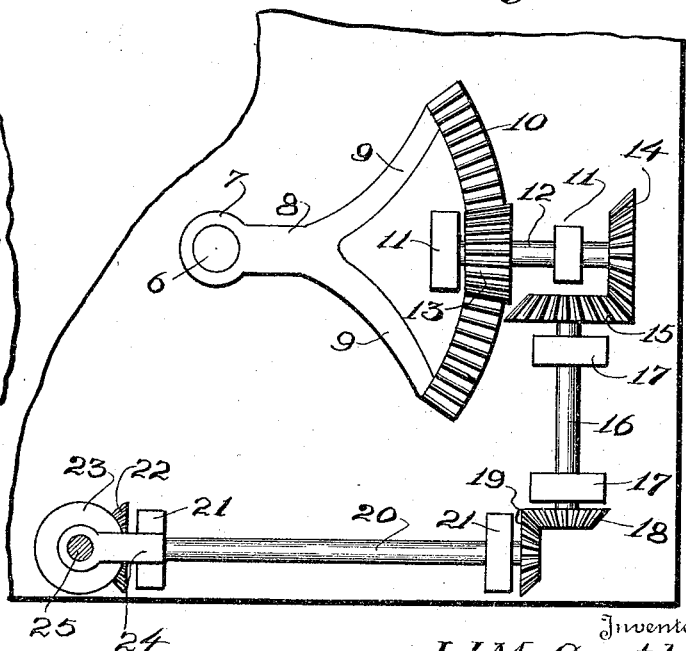
Figure 3:
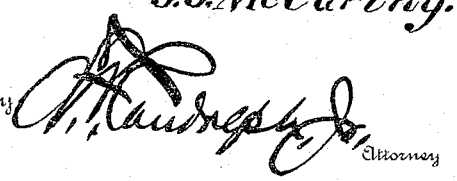

Figure 1 is a fragmentary side view of a locomotive showing this improved headlight applied thereto. Fig. 2 is a fragmentary view of the interior of the cab of the locomotive showing the method of controlling the headlight manually. Fig. 3 is a fragmentary plan view of the forward end of the locomotive illustrating the device attached thereto. Fig. 4 is a front view of a fragment of a locomotive boiler showing the modified form of the attachment applied thereto. Fig. 5 is a plan view of Fig. 4. Fig. 6 is a sectional view on line 6—6 of Fig. 4, and Fig. 7 is a sectional view of line 7—7 of Fig. 4.

Referring now to the drawings by characters of reference, the numeral 1 designates the boiler of the locomotive while the numeral 2 designates the cab. The locomotive is provided with the usual pilot 3 and the forward end is supported on the ordinary pony truck 4. The pilot platform 5 which is mounted directly over the pony truck is designed to support the headlight operating mechanism which will be more fully hereinafter described. Connected to the cradle pin 6 of the truck 4 is a suitable collar 7 having formed thereon, the shank 8 provided with the branch arms 9 which terminate at their outer ends in the segmental rack bar 10. It will thus be seen that when the pony truck turns the cradle pin the segmental bar will be swung. A suitable bracket 11 is supported at a point near the forward end of the platform 5 and journaled in this bracket is the shaft 12 on which the gear wheel 13 is mounted. The opposite end of the shaft carries the beveled gear wheel 14 which meshes with the beveled gear 15 carried on the shaft 16 which is mounted in the bracket 17 secured near the forward end of the platform. The opposite end of the shaft 16 has connected thereto, the beveled gear 18 which in turn meshes with the beveled gear 19 carried by the shaft 20 which is mounted in the brackets 21, which are supported adjacently to one side of the platform as clearly shown in Figs. 6 and 3. A bevel gear 22 is mounted on the ends of the shaft 20 and meshes with the bevel gear 23 carried in the angular extension 24 of the rear bracket 21 which angular extension forms a journal bearing for the shaft 25 on which the wheel 23 is mounted. The upper end of this shaft is supported in a suitable bracket 26 carried by the boiler of the locomotive, which is provided with the angular extension 27 in which the shaft is journaled and the upper extension 28 in which the shaft 29 is journaled. The shaft 25 is provided with a bevel gear 30 while the shaft 29 is provided with a bevel gear 31 and these gears are normally in mesh so that upon rotation of the shaft 25, the shaft 29 will be turned.

A suitable bracket 32 is carried by the locomotive boiler and forms a support for the inner end of the shaft 29 as clearly shown in Fig. 4. The end of the shaft 29 is rectangular in cross section as at 33 on which the clutch half 34 is mounted. This clutch half 34 is provided with a grooved extension 35 in which the fork member 36 operates so that the clutch may be thrown into and out of operation. The clutch half 34 coöperates with the clutch half 37 carried by the shaft 38 which is journaled in the bracket 39 and this shaft 38 is also rotatably mounted in the brackets 40 and 41. Splined on the shaft 38 intermediate the brackets 40 and 41 is a suitable beveled gear 42 provided with a grooved extension 43 in which the downwardly extending bifurcated arm 44 of the light carriage 45 is mounted. It will thus be seen that as the carriage and light move across the supporting bars the wheel 42 will be moved longitudinally of the flange portion of the bar 38.

The brackets 40 and 41 extend upwardly and outwardly as illustrated in Fig. 6 and the upper ends of the brackets are bored to receive the ends of the shaft or supporting bar 46 on which the guide ears 47 of the lamp platform 45 are slidable. Supported at the lower rearmost portion of the brackets 40 and 41 is a worm shaft 48 on which the ears 49 of the lamp platform are mounted. These ears are provided with internally screw threaded openings for the reception of the threaded bar 48 and it will thus be seen that when the bar is turned, the lamp carriage will be moved longitudinally of the bars 38 and 46.

The clutch half 34 is thrown into and out of engagement with the clutch half 37 by means of the bifurcated arm 36 which is mounted on the shaft 50 which extends rearwardly of the locomotive and is provided at its rear end with the handle 51 by which it is actuated. In order to manually control the headlight, the bevel gear 52 is mounted on the shaft 38 and meshes with the bevel gear 53 carried on the shaft 54 which extends through the tubular shaft 55 and into the cab of the locomotive terminating in the hand wheel 56 by means of which the shaft is turned.

In order to control the movement of the lamp to one side or to the other, the beveled gear 57 is mounted on the end of the shaft 48 and meshes with the beveled gear 58 carried on the end of the shaft 55 which is mounted in the bearings 59, and terminates on the interior of the cab in a suitable hand wheel 60 by means of which it may be rotated.

Extending centrally through the carriage 45 of the lamp is a suitable shaft 61 supporting at its lower end the beveled gear 62 which meshes with the gear 42. The upper end of the shaft supports the lamp 63 and it will thus be seen that when the shaft 38 is rotated, the bevel gear 42 will drive the beveled gear 62 and thereby cause the lamp to revolve.

It will be apparent from the foregoing that in use when the clutch is thrown into engagement, it will be apparent that the turning of the pony truck will cause the lamp to turn in the direction taken and thus illuminate the track. If however, it is desired to manually actuate the device, the clutch is thrown out of engagement thereby releasing the operation of the device from the pilot. The wheel 56 may then be turned and it will be apparent that the rotation of the shaft 54 will cause the shaft 38 to be turned, thereby turning the lamp in whatever direction may be desired by the user.

In order that the rear end of the train may be seen the lamp may be shifted to the side of the locomotive by the operation of the shaft 55 rotating the screw 48 and the lamp may be then swung by the operation of the shaft 54 so as to throw the light rays to the rear end of the train.

It is to be understood that if so desired bell cranks may be substituted in place of the gears as operating means.

While in the foregoing there has been shown and described the preferred embodiment of this invention, it is to be understood that such changes may be made in the combination and arrangement of parts as will fall within the spirit and scope of the appended claims.

What is claimed is:

1. In combination with a locomotive, a headlight carried by the locomotive, means connected to the pony truck of the locomotive to turn the headlight upon the turning of the pony truck and means to adjust the headlight laterally of the locomotive.

2. In combination with a locomotive, a headlight mounted at the forward end thereof, means to adjust the headlight laterally, means connected to the pony truck of the locomotive to cause the headlight to turn upon the turning of the pony truck, and means to disconnect the headlight turning means from the pony truck.

3. In combination with a locomotive, a headlight carried at the forward end of the locomotive and arranged to be adjusted laterally, a revolving means carried by the headlight, means connected to the revolving means and to the pony truck to cause the light to turn with the turning of the pony truck and a clutch to disengage the turning means of the headlight from the means carried by the pony truck.

4. In combination with a locomotive, a supporting frame at the forward end of the locomotive, a laterally sliding carriage on the supporting frame, a turn table mounted on the carriage supporting the headlight, means to revolve the turn table simultaneously with the movement of the pony truck of the locomotive, means to disengage the revolving means from the pony truck and means to manually control the revolution of the turn table and the sliding of the carriage.

5. In combination with a vehicle, a headlight carried by the vehicle, means connected to the running gear to turn the headlight upon the turning of said running gear, and means to adjust the headlight laterally of the vehicle.

In testimony whereof I affix my signature in presence of two witnesses.

JAMES J. McCARTHY.

Witnesses:
B. F. THOMPSON,
JAKE LEVINE.

Copies of this patent may be obtained for five cents each, by addressing the "Commissioner of Patents, Washington, D. C."